United States Patent
Ebi

(10) Patent No.: US 7,274,374 B2
(45) Date of Patent: Sep. 25, 2007

(54) MAP DISPLAY DEVICE AND METHOD FOR OPERATING THEREOF

(75) Inventor: Masaki Ebi, Kariya (JP)

(73) Assignee: DENSO Corporation, Kariya (JP)

( * ) Notice: Subject to any disclaimer, the term of this patent is extended or adjusted under 35 U.S.C. 154(b) by 173 days.

(21) Appl. No.: 11/057,850

(22) Filed: Feb. 15, 2005

(65) Prior Publication Data

US 2005/0190197 A1    Sep. 1, 2005

(30) Foreign Application Priority Data

Feb. 26, 2004  (JP)  ............................. 2004-051431
Dec. 1, 2004   (JP)  ............................. 2004-348597

(51) Int. Cl.
*G09G 5/02* (2006.01)
*G09G 5/36* (2006.01)
*G08G 1/123* (2006.01)
*G01C 21/00* (2006.01)
*G06K 9/00* (2006.01)
*G09G 5/00* (2006.01)
*H04N 1/46* (2006.01)
*G03F 3/08* (2006.01)

(52) U.S. Cl. ........................ 345/589; 345/593; 345/59; 340/990; 340/995.1; 340/995.18; 701/208

(58) Field of Classification Search ................ 345/156, 345/173, 589, 541, 547–549, 593, 596, 597; 701/208–210, 200–201; 340/990, 995, 995.17, 340/995.18; 382/162–167; 358/515–519
See application file for complete search history.

(56) References Cited

U.S. PATENT DOCUMENTS

| | | | |
|---|---|---|---|
| 4,965,574 A | | 10/1990 | Fukushima et al. |
| 5,757,359 A | * | 5/1998 | Morimoto et al. ........... 345/156 |
| 6,144,318 A | * | 11/2000 | Hayashi et al. ........ 340/995.19 |
| 6,266,613 B1 | * | 7/2001 | Nimura et al. .............. 701/210 |
| 7,069,519 B1 | * | 6/2006 | Okude et al. ................ 715/778 |
| 2001/0036308 A1 | * | 11/2001 | Katayama et al. .......... 382/166 |

FOREIGN PATENT DOCUMENTS

| | | |
|---|---|---|
| JP | A-H03-7638 | 1/1991 |
| JP | A-H03-085584 | 4/1991 |
| JP | A-H03-135719 | 6/1991 |
| JP | A-H06-38181 | 5/1994 |
| JP | B-H06-38181 | 5/1994 |
| JP | A-H06-236146 | 8/1994 |
| JP | A-H10-333555 | 12/1998 |

* cited by examiner

*Primary Examiner*—Wesner Sajous
(74) *Attorney, Agent, or Firm*—Posz Law Group, PLC

(57) ABSTRACT

A car navigation device displays a map by using display colors included in a first color pallet when the speed of a vehicle traveling is lower than a predetermined value and displays the map by using display colors included in a second color pallet having a group of display colors of contrasts higher than those of the group of display colors of the first color pallet when the speed of the vehicle traveling is greater than the predetermined value.

15 Claims, 7 Drawing Sheets

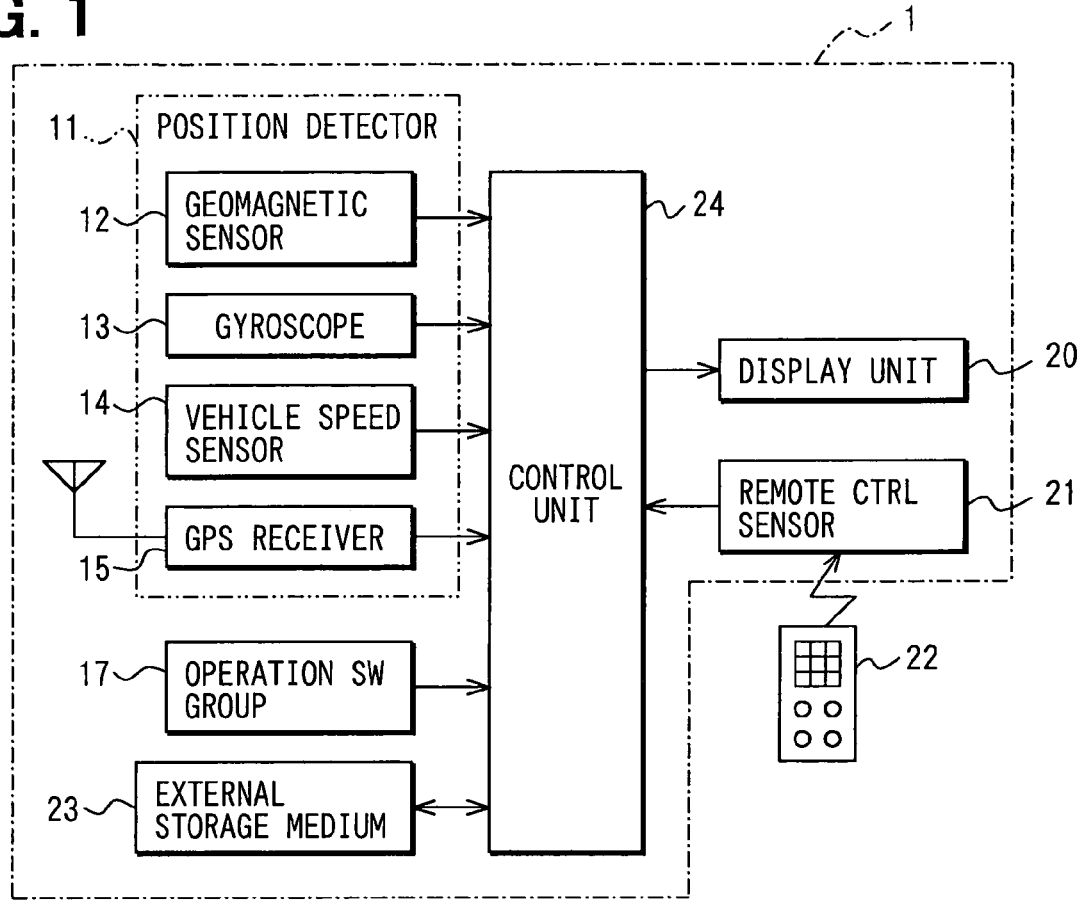

FIG. 3

| PALLET NO. | DISPLAY COLOR | | |
|---|---|---|---|
| | R | G | B |
| 1 | 161 | 101 | 189 |
| 2 | 209 | 111 | 119 |
| 3 | 119 | 161 | 138 |
| 4 | 148 | 213 | 158 |
| 5 | 162 | 170 | 200 |
| 6 | 207 | 193 | 207 |
| 7 | 214 | 214 | 214 |

FIG. 4

| PALLET NO. | DISPLAY COLOR | | |
|---|---|---|---|
| | R | G | B |
| 1 | 43 | 0 | 138 |
| 2 | 255 | 0 | 0 |
| 3 | 0 | 52 | 0 |
| 4 | 56 | 255 | 88 |
| 5 | 67 | 94 | 203 |
| 6 | 150 | 118 | 166 |
| 7 | 250 | 250 | 250 |

MAP DISPLAY DEVICE AND METHOD FOR OPERATING THEREOF

CROSS REFERENCE TO RELATED APPLICATIONS

This application is based upon, claims the benefit of priority of, and incorporates by reference the contents of, Japanese Patent Application No. 2004-51431 filed on Feb. 26, 2004 and Japanese Patent Application No. 2004-348597 filed on Dec. 1, 2004.

FIELD OF THE INVENTION

The present invention relates generally to a map display device of a car navigation device and, more particularly, to a map display device that uses coloring to specify certain elements.

BACKGROUND OF THE INVENTION

Conventionally, a display map in a car navigation device uses a color pallet for assigning display colors to constituent elements of the map display such as a road, a landmark and a name of a wide area. The color pallet is data for coloring so that the constituent elements correspond to displayed colors of the constituent elements.

For example, JP-A-3-7638 discloses a car navigation device which includes two kinds of color pallets, and switches between them depending upon the vehicle speed.

According to the above car navigation device, a large amount of map data is displayed for easily confirming the present position when the vehicle is traveling at a low speed, and important data only is displayed for maintaining safety when the vehicle is traveling at a high speed. Specifically, according to the above technology, small roads are displayed in the same color as the background color when traveling at high speeds, so that the small roads cannot be substantially seen by a user.

According to this technology, however, the data which cannot be substantially seen may, in practice, be what the user actually desires to confirm. Therefore, it is not desirable for the display data to be substantially erased even when the two color pallets are switched in displaying the map.

SUMMARY OF THE INVENTION

In view of the above-mentioned point, it is an object to provide a novel method for displaying the coloring constituent elements of a map display device.

To achieve the above object, the map display device according has constituent elements of a map, a first color pallet, a second color pallet, judges whether the first color pallet or the second color pallet be used for displaying the constituent elements, and displays the constituent elements of the map on a display unit in colors based on the pallet that is determined to be used. A group of display colors used for the coloring of the second color pallet has color contrasts higher than those of a group of display colors used for the coloring of the first color pallet.

Thus, the coloring of the constituent elements of the map display can be changed by a novel method of switching between the two color pallets having different color contrasts.

Here, a high color contrast of the group of display colors refers to a large sum of square powers of distances among the colors pertaining to the group of display colors. When colors are expressed as the synthesis of three prime colors of light, i.e., R(red), G(green) and B(blue), and when two colors are plotted in a three-dimensional space with the intensities of R, G and B as independent orthogonal coordinate values, a distance between the colors stands for a distance between two plotted points.

The constituent elements can be easily discerned when a group of display colors having high color contrasts is used for coloring the constituent elements of the map display in comparison to when the group of display colors having low color contrasts is used for coloring the constituent elements of the map display. Further, when the group of display colors having high color contrasts is used for coloring the constituent elements of the map display, the user who sees the map display feels less fatigue in his eyes than when the group of display colors of low color contrasts is used for coloring the constituent elements of the map display.

The color system of coloring for a particular constituent element in the first color pallet may be nearly the same as the color system of coloring for the particular constituent element in the second color pallet. Then, nearly the same color system is assigned to the same constituent element even when the map is displayed while switching between the two color pallets. Therefore, a change in the display color of the constituent elements will not appear to be offensive to the user despite the changing of the color pallet.

When the two color systems are nearly the same as described above, the coloring for the particular constituent element of the second color pallet may correspond to the one in which the intensity of a principal component constituting the color system of the coloring is increased among the three prime colors of light as compared to the coloring for the particular constituent element of the first color pallet.

Further, in the coloring for the particular constituent element of the second color pallet, the intensity of a minor component constituting the color system of the coloring is decreased among the three prime colors of light as compared to the coloring for the particular constituent element of the first color pallet.

Further, in the coloring for the particular constituent element of the second color pallet, the color system is dense as compared to that of the coloring for the particular constituent element of the first color pallet.

Further, the map display device is mounted on a vehicle, and determining means determines to use the second color pallet when the speed of the vehicle traveling is greater than a predetermined value, and determines to use the first color pallet when the speed of the vehicle traveling is smaller than the predetermined value.

Therefore, the map display device displays the map using display colors of the first color pallet when the vehicle is traveling at low speeds. This approach causes less fatigue to the eyes than the display colors of the second collar pallet. The map is displayed by using display colors of the second color pallet having high color contrasts when the vehicle is traveling at high speeds, thereby enabling the user to quickly discriminate the constituent elements on the map, and shorten the necessary time for seeing the map.

Further, the map display device is mounted on a vehicle, and the determining means determines to use the second color pallet when the amount of sunlight falling on the vehicle that is traveling is greater than a predetermined value, and determines to use the first color pallet when the amount of sunlight falling on the vehicle that is traveling is smaller than the predetermined value.

Therefore, the map display device displays the map using the display colors of the first color pallet which cause less fatigue to the eyes than the display colors of the second collar pallet when the amount of sunlight is smaller than the predetermined value. When the amount of sunlight is greater than the predetermined amount, the map is displayed by using the display colors of the second color pallet having high color contrasts, enabling the user to see the map more vividly.

Further, the determining may be to use the first color pallet or the second color pallet for the display of the constituent element based on a setting operation by a user.

A group of display colors used for the coloring of the second color pallet for part of the constituent elements has color intensities which are the same as, or lower than, those of a group of display colors used for the coloring of the first color pallet for part of the constituent elements.

Then, a change in the color contrast of the first color pallet and the second color pallet can be varied for the groups of the constituent elements.

Further, the coloring specified by the second color pallet for a plurality of the constituent elements may be farther from the coloring for a particular constituent element in the first color pallet than the coloring specified by the first color pallet for the plurality of constituent elements.

Therefore, the coloring of the plurality of the constituent elements from the coloring of the particular constituent element becomes farther with the second pallet than with the first pallet. This makes it possible to vary the color contrast with the particular constituent element as a reference. Here, "farther" means that the distance is large between the colors.

The particular constituent element may be that of the background. Therefore, the color contrast can be varied based on the background in a state where other constituent elements are superposed thereon.

Further, the map display device may form the second color pallet such that the color contrasts of a group of constituent elements superposed one upon the other become greater than those of the first color pallet among the constituent elements displayed on the display unit.

It is, therefore, made possible to flexibly vary the second color pallet in a manner to increase the color contrast among the constituent elements that are superposed depending upon the superposed state in the display of the constituent elements.

BRIEF DESCRIPTION OF THE DRAWINGS

The above and other objects, features and advantages of the present invention will become more apparent from the following detailed description made with reference to the accompanying drawings:

FIG. 1 is a block diagram of a car navigation device according to a first embodiment;

FIG. 2 is an exemplary diagram illustrating a classification versus pallet number table;

FIG. 3 is an exemplary diagram illustrating a first color pallet;

FIG. 4 is an exemplary diagram illustrating a second color pallet;

DETAILED DESCRIPTION OF THE PREFERRED EMBODIMENTS

First Embodiment

Figure 5:
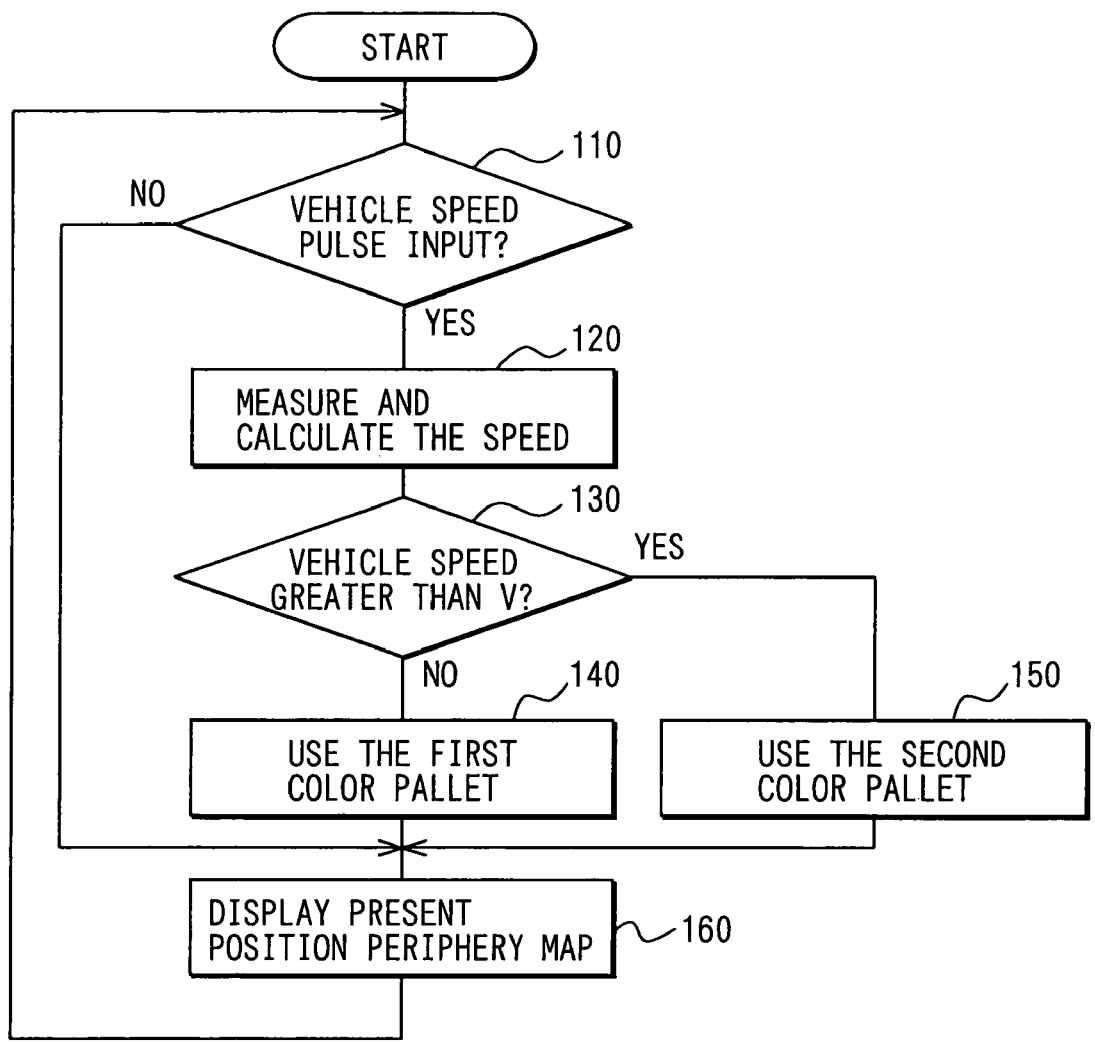
FIG. 5 is a flowchart of a map display program.

A first embodiment will now be described. FIG. 1 illustrates a block diagram of a car navigation device 1 according to the first embodiment. The car navigation device 1 includes a position detector 11, an operation switch group 17, a display unit 20, a remote control sensor 21, an external storage medium 23 and a control circuit 24.

The position detector 11 includes a geomagnetic sensor 12, a gyroscope 13, a vehicle speed sensor 14 for producing vehicle speed pulse signals based on the revolution of a wheel, and a GPS receiver 15 for the global positioning system (GPS) for detecting the position of the vehicle based on the electromagnetic waves from a satellite, all of which are known. These sensors 12 to 15 send, to the control circuit 24, the data for specifying the present position based on various properties.

The group of operation switches 17 comprises input devices, such as a plurality of mechanical switches provided surrounding the display surface of the display unit 20 and a touch panel provided overlapped on the display surface, and sends, to the control circuit 24, signals produced when the mechanical switches are depressed (e.g., when push buttons are depressed) or when the touch panel is touched by the user.

The display unit 20 has a display surface such as a liquid crystal display and displays an image on the display surface such as the liquid crystal display depending upon video signals input from the control circuit 24.

The remote control sensor 21 sends, to the control circuit 24, the signals received from a remote control unit 22 that transmits radio signals such as of infrared rays based on the operation by the user.

The external storage medium 23 has a nonvolatile storage medium such as an HDD (hard disk drive) and produces the data stored in the nonvolatile storage medium or stores input data based upon a control instruction from the control circuit 24. The data stored by the external storage medium 23 include map matching data for improving the precision of position detection described above, various data such as map data and mark data, and programs for operating the car navigation device 1.

The map data is such so that the attributes like a position on the map on where a constituent element is drawn, a relation of connection to other constituent elements, the name of the constituent element, the shape of the constituent element and the class and kind of the constituent element, correspond to each of the constituent elements of the map such as a particular road, a building, a background or a character drawn on the display unit 20.

Values that can be assumed by the class and kind (classification) of the constituent element will be, for example, an expressway, a national highway, a local road, a green zone, a water zone, a building and a background. In this embodiment, a color displaying the constituent element of the map is determined based upon the classification corresponding to the constituent element. Therefore, the map data of this embodiment has a classification vs. pallet number table in which attributes of the classes and kinds correspond to the pallet numbers. FIG. 2 illustrates an exemplary classification vs. pallet number table. In this drawing, pallet numbers 1, 2, 3, 4, 5, 6 and 7 correspond to an expressway, a national highway, a local road, a green zone, a water zone, a building and a background which are attributes of the class and kind.

The map data includes two color pallet tables (hereinafter referred to as color pallets) in which the pallet numbers correspond to the practical display colors assigned to the pallet numbers. FIG. 3 illustrates a table of a first color pallet which is one of the two color pallets, and FIG. 4 illustrates a table of a second color pallet which is another color pallet.

All of the rows except the head row in FIGS. 3 and 4 express a correspondence between one pallet number and one display color. The item on the extreme left side of each row represents the pallet number, and the remaining items represent colors. In the color pallet, the display color is expressed by a distribution of intensities of three prime colors of light, i.e., R (red), G (green) and B (blue) Among the items representing display colors in each row in FIGS. 3 and 4, the item on the left side represents the intensity of R (red), the item at the center represents the intensity of G (green), and the item of the right side represents the intensity of B (blue). The intensities are expressed by values of 0 to 255, and the intensity increases with an increase in the value.

For example, an intensity 119 of R, an intensity 161 of G and an intensity 138 of B, expressing a pale green color, correspond to a pallet number 3 of the first color pallet. An intensity 255 of R, an intensity 0 of G and an intensity 0 of B, expressing a dense red color, correspond to a pallet number 2 of the second color pallet.

Thus, the first color pallet and the second color pallet specify the colors for the respective attributes of the classes and kinds of the constituent elements of a map.

As will be described later, the car navigation device 1 selects either the first color pallet or the second color pallet as a display color corresponding to the pallet number.

A difference between the first color pallet and the second color pallet is that a group of display colors in the second color pallet have higher color contrasts than those of a group of corresponding display colors in the first color pallet. A high color contrast in the group of display colors stands for a large sum of squares of distances among the colors pertaining to the group of the display colors. When two colors are plotted in a three-dimensional space with the intensities of R, G and B as independent orthogonal coordinate values, a distance between the colors stands for a distance between two plotted points.

Concretely speaking, if the intensity of red of a pallet number i in a particular color pallet is denoted by Ri, the intensity of green by Gi and the intensity of blue by Bi, then, a color contrast H in the group of display colors corresponding in this particular color pallet is expressed by an equality $H=\Sigma\{(Ri-Rj)^2+(Gi-Gj)^2+(Bi-Bj)^2\}$ where $\Sigma$ is the sum for i and j ($i \neq j$).

A color corresponding to a given pallet number in the first color pallet and a color corresponding to the same pallet number in the second color pallet are the display colors of the same system. Further, the color corresponding to the same pallet number in the second color pallet is denser than the color corresponding to the same pallet number in the second color pallet.

The display colors corresponding to the same pallet number in the first color pallet and in the second color pallet are rendered to be of the same system, and the system color of the second color pallet is rendered to be denser than the system color of the first color pallet by the following method.

That is, among the display colors R, G and B corresponding to a given pallet number in the first color pallet, a color in which the intensity of a principal component constituting the system color is increased and/or in which the intensity of the minor component is decreased, is regarded to be a display color corresponding to the same pallet number in the second color pallet.

For example, the color corresponding to the pallet number 2 is of the red system. Among R, G and B, the principal component constituting the color of the red system is R. In the second color pallet, therefore, the display color of the same pallet number is the one in which the value of R is increased to 255 and the values of G and B are decreased to 0 in contrast with the display color of the same pallet number in the first color pallet.

Further, the color corresponding to the pallet number 1 is of the violet system. Among R, G and B, principal components constituting the color of the violet system are R and B. In the second color pallet, therefore, the display color of the same pallet number is the one in which the value of G is decreased to 0 in contrast with the display color of the same pallet number in the first color pallet.

Further, the color corresponding to the pallet number 7 is of the white system. Among R, G and B, principal components constituting the color of the white system are R, G and B. In the second color pallet, therefore, the display color of the same pallet number is the one in which the values of R, G and B are all increased to 250 in contrast with the display color of the same pallet number in the first color pallet.

The control circuit 24 is constituted as an ordinary computer and includes a CPU, a ROM, a RAM, a flash memory, an I/O, and a bus line for connecting them. The control circuit 24 executes a program read out from the ROM or the external storage medium 23 for operating the car navigation device 1, reads out the data from the ROM, RAM or flash memory at the time of execution, writes the data into the RAM and the flash memory, and exchanges signals with the position detector 11, the group of operation switches 17, the display unit 20 and the remote control sensor 21 via the I/O.

When the car navigation device 1 starts, the CPU in the control circuit 24 reads a boot program, an operating system (hereinafter referred to as OS) and the like from the ROM, executes them, and performs the hardware control and the process management based on the OS. The process operating on the OS may be, for example, a menu program, a program for setting the destination, a program for searching the route, a program for displaying a map and other programs.

In executing these programs, if it is necessary to specify the present position, the CPU in the control circuit 24 calculates the present position based on the signals for specifying the present position output from the sensors 12 to 15 in the position detector 11. Here, the outputs from various sensors 12 to 15 contain errors of different properties. Therefore, the present position is specified by the CPU in the control circuit 24 by using a plurality of sensors in a complementary manner.

In the following description, the program by which the CPU performs the above-mentioned execution operations will be discussed.

The menu program hierarchically displays the menu of various programs operating on the OS depending upon the functions and objects of the programs, and starts executing the program selected by the user from those displayed as a menu. The menu is displayed by outputting the image data to the display unit 20, and the selection by the user is detected based on the signal input to the control circuit 24 by the selection operation (moving the cursor, depressing the determination button, etc.) for the remote control unit 22 through the remote control sensor 21 or for the group 17 of operation switches.

The program for setting the destination produces on the display unit 20 a display prompting the user to input the destination, and stores the object in RAM in the control circuit 24 based on the destination that is input by the user through the remote control unit 22 or the group 17 of operation switches.

The program for searching the route automatically selects an optimum route from the present position to the destination set by the program as described above, and displays the selected route as a guide route on the display unit 20. Here, the Dijkstra method for automatically setting an optimum route, which is known, may be used.

The map display program is executed based upon the operation selected by the user from the menu. A mark is displayed indicating the present position of the vehicle based on the present position data. Further, map data read by the external storage medium 23, and additional data such as a guide route formed by a program for searching the route, are also displayed in a superposed manner on the display surface of the display unit 20.

FIG. 5 is a flowchart of the map display program. At step 110, first, it is determined whether a vehicle speed pulse signal is input from the vehicle speed sensor 14. When the vehicle speed pulse signal is input, a processing at step 120 is executed. When the vehicle speed pulse signal is not input, a processing at 160 is subsequently executed.

At step 120, the operation is executed for measuring the speed of the vehicle that is traveling based upon the output interval between the vehicle speed pulse signals.

Next, at step 130, it is determined whether the speed of the vehicle measured at step 120 is greater than a predetermined speed V (e.g., 40 km/h). When the vehicle speed is lower than the predetermined speed V, the processing is executed at step 140. When the vehicle speed is greater than the predetermined speed V, the processing is executed at step 150.

At step 140, the processing is executed for using the first color pallet. Concretely speaking, a value of the selection flag maintained in a predetermined region of RAM of the control circuit 24 is set to a value for selecting the first color pallet.

At step 150, the processing is executed for using the second color pallet. Concretely speaking, a value of the selection flag is set to a value for selecting the second color pallet.

After steps 140 and 150, the map around the present position is displayed on the display unit 20 at step 160. Concretely speaking, the present position of the vehicle is specified based on a signal from the position detector 11, the data of constituent elements of the map in the region including the specified position are read from the map data, and a map of a combination of the constituent elements based on the above data is displayed on the display unit 20.

At this moment, the value of the class and kind of the constituent elements to be displayed is specified, the pallet number corresponding to the value of the class and kind is read out from the classification vs. pallet number table, and the display color corresponding to the corresponding pallet number is specified to thereby specify the display color of the constituent elements to be displayed.

Upon reading the selection flag, the display color corresponding to the pallet number is specified based on the first color pallet when the value is for selecting the first color pallet and is specified based on the second color pallet when the value is for selecting the second color pallet.

After the step 160, the processing returns to step 110, which is executed again.

Upon executing the map display program repeating the processing of steps 110 to 160, the control circuit 24 displays the map by using the display colors included in the first color pallet (see steps 130 and 140) when the speed of the vehicle traveling is lower than the predetermined value V, and displays the map by using the display colors included in the second color pallet having the group of display colors of higher contrasts than those of the group of display colors in the first color pallet (see steps 130 and 150) when the speed of the vehicle traveling is larger than the predetermined value V. When the vehicle speed is unknown, the map is displayed by using the color pallet that has been previously used (see steps 110 and 160).

Figure 6:
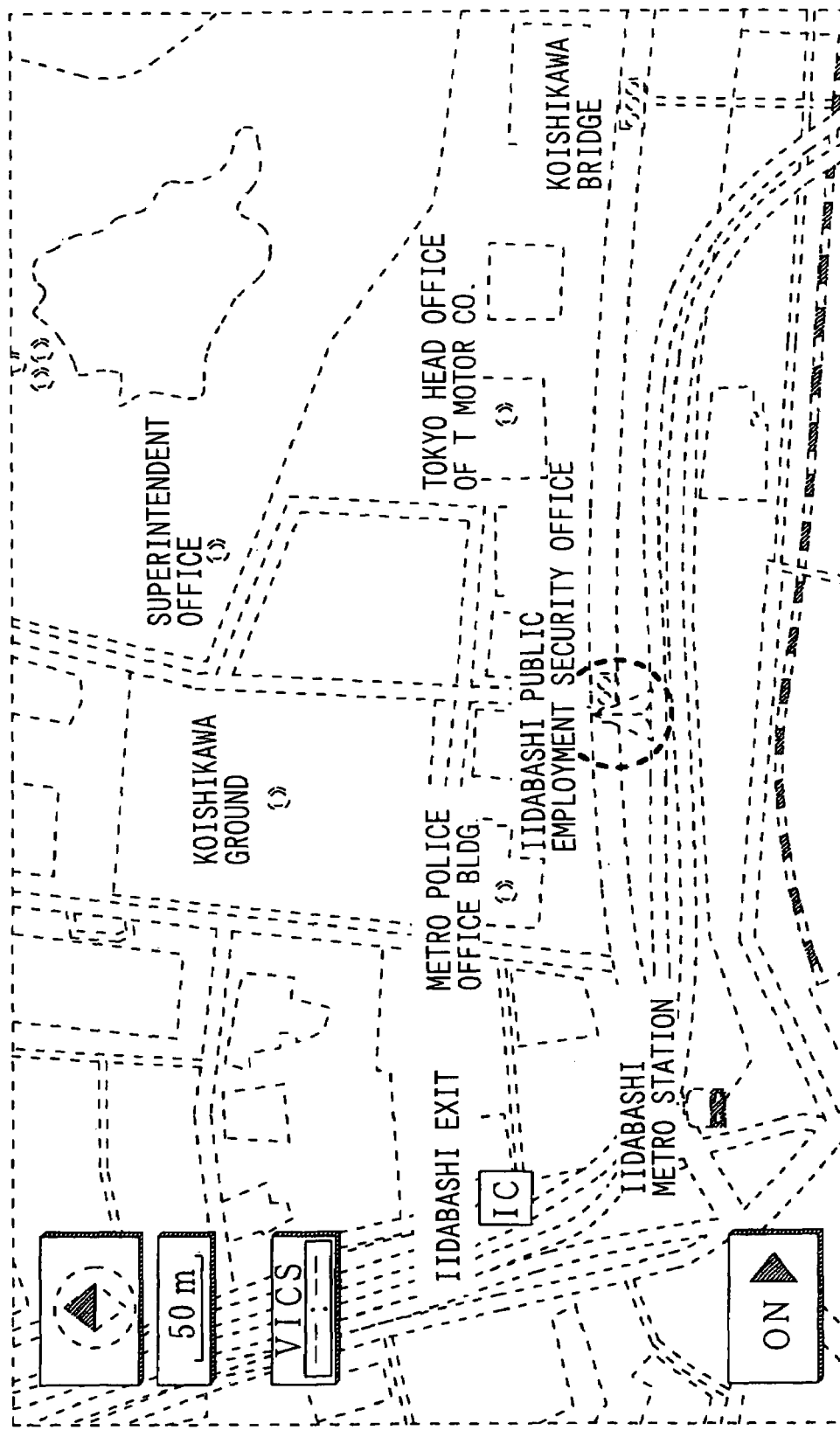
FIG. 6 is a diagram of a map that is displayed by using the first color pallet.
Figure 7:
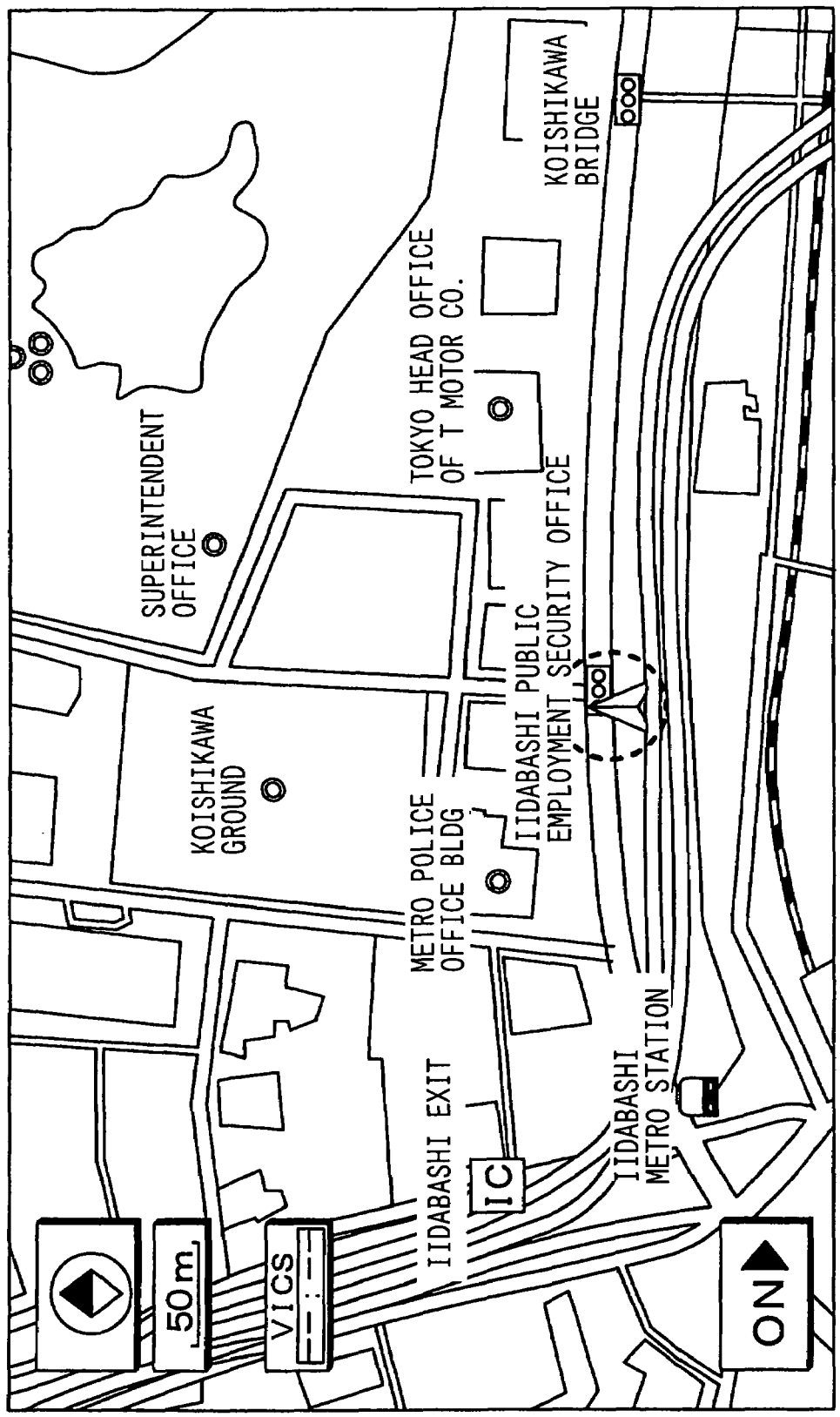
FIG. 7 is a diagram of a map of the same region as that of FIG. 6 that is displayed by using the second color pallet.

FIG. 6 illustrates a map that is displayed when the first color pallet is used, and FIG. 7 illustrates a map of the same region that is displayed by using the second color pallet. From the comparison of FIG. 6 with FIG. 7, the same constituent elements on the map are displayed in different colors depending upon when the first color pallet is used and when the second color pallet is used.

When the vehicle is traveling at low speeds as described above, the car navigation device 1 displays the map using display colors of the first color pallet that causes less fatigue to the eyes than the display colors of the second color pallet. When the vehicle is traveling at high speeds, the car navigation device 1 displays the map using display colors of the second color pallet having high color contrasts, enabling the user to quickly discriminate the constituent elements on the map, and shortening the time for seeing the map.

Second Embodiment

Next, described below is a second embodiment. As for the constitution and operation of this embodiment, described below are only those portions that are different from those of the first embodiment.

Figure 8:
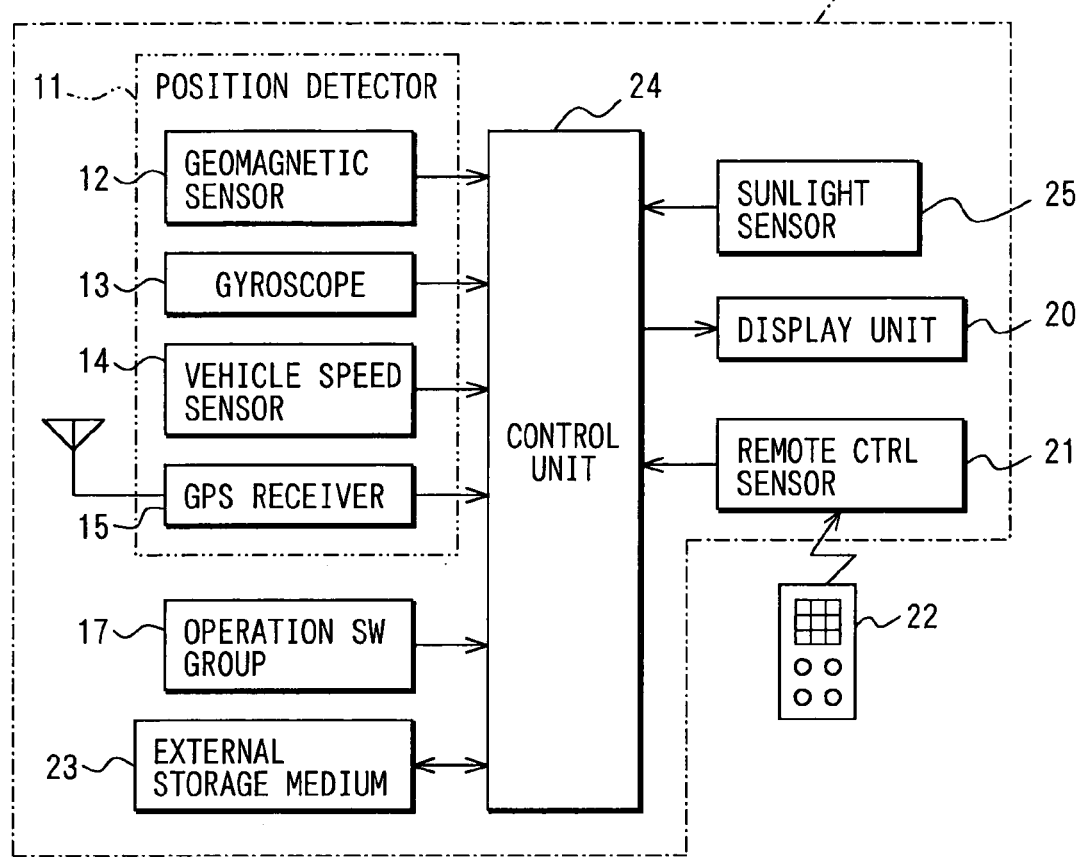
FIG. 8 is a block diagram of the car navigation device according to a second embodiment.

FIG. 8 illustrates the constitution of the car navigation device 1 according to this embodiment. The car navigation device 1 of the second embodiment differs from that of the first embodiment by including a sunlight sensor 25.

The sunlight sensor 25 is installed near the windshield of the vehicle, and converts light energy of sunlight into electric energy to be output, thereby sending a signal that varies depending upon the amount of sunlight to the control circuit 24.

In this embodiment, the programs executed by the control circuit 24 are equivalent to the programs executed by the control circuit 24 in the first embodiment except the map display program.

Figure 9:
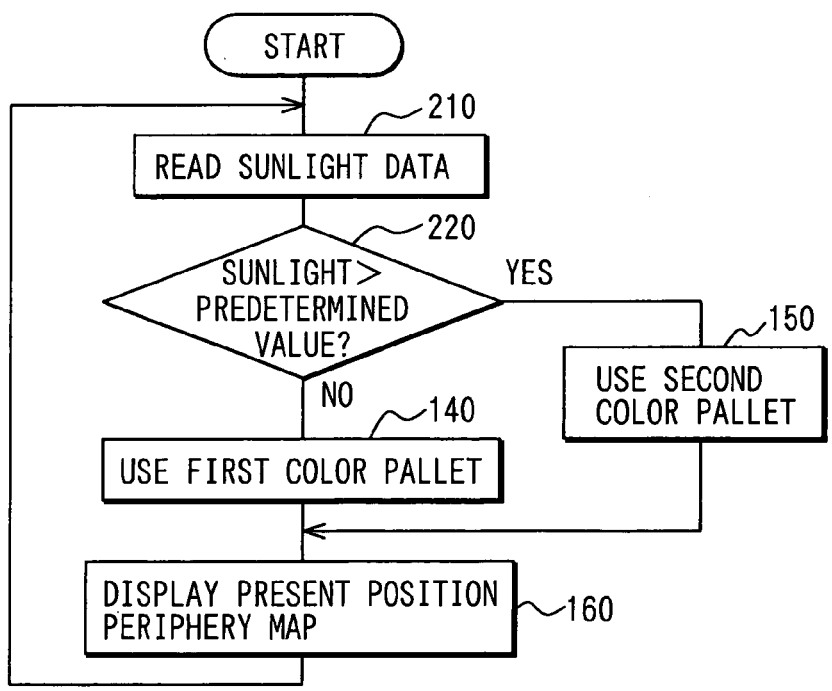
FIG. 9 is a flowchart of a map display program according to the second embodiment.

FIG. 9 is a flowchart of the map display program in the control circuit 24 that receives the signal from the sunlight sensor 25. In FIGS. 9 and 5, steps denoted by the same reference numerals execute the same processing and are not described here in detail again.

At step 210, first, a signal based on the amount of sunlight is received from the sunlight sensor 25.

Next, at step 220, the amount of sunlight is specified based on the signal that is received to determine whether the specified amount of sunlight is greater than a predetermined value F (e.g., 7 $Wh/m^2$ per minute). When the amount of sunlight is smaller than the predetermined value F, the processing of step 140 is executed. When the amount of sunlight is equal to or greater than the predetermined value F, the processing of step 150 is executed.

Upon executing the map display program repeating the processing of steps 210 to 160, the control circuit 24 displays the map using the display colors included in the first color pallet (see steps 220→140) when the amount of sunlight is smaller than the predetermined value F, and displays the map using the display colors included in the second color pallet having the group of display colors of contrasts higher than those of the group of display colors of the first color pallet (steps 220→150) when the amount of sunlight is equal to or greater than the predetermined value F.

Therefore, when the amount of sunlight is small, the car navigation device 1 displays the map using the display colors of the second color pallet which cause less fatigue to the eyes than the display colors of the second color pallet. When the amount of sunlight is great and the map displayed on the display unit 20 cannot be easily seen, the map is displayed by using the display colors of the second color pallet having high contrasts, enabling the user to see the map more vividly.

Third Embodiment

Next, described below is a third embodiment of the invention. As for the constitution and operation of this embodiment, described below are only those portions that are different from those of the first embodiment.

The hardware constitution of the car navigation device 1 of this embodiment is the same as the hardware constitution of the car navigation device 1 of the first embodiment. In this embodiment, the programs executed by the control circuit 24 are equivalent to the programs executed by the control circuit 24 in the first embodiment except the map display program.

Figure 10:
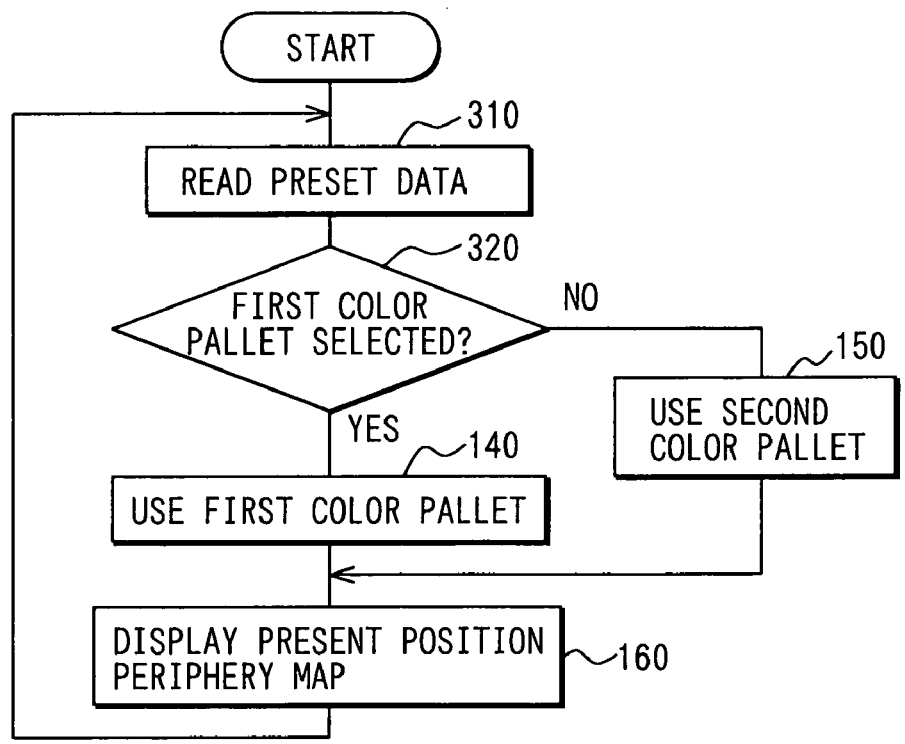
FIG. 10 is a flowchart of the map display program according to a third embodiment.

FIG. 10 is a flowchart of the map display program according to this embodiment. In FIGS. 10 and 5, steps denoted by the same reference numerals executing the same processing are not described here in detail again.

At step 310, first, preset data is obtained. The preset data refers to data stored in a predetermined region in the external storage medium 23 and include a value for using the first color pallet and a value for using the second color pallet.

The values of the preset data are rewritten by the control circuit 24 when the user executes an operation for varying the preset data using the group of operation switches 17 or the remote control unit 22. That is, the preset data are the data that can be rewritten by the user.

Next, at step 320, it is determined whether the preset data has a value for using the first color pallet. When the value is for using the first color pallet, the processing is then executed at step 140. When the value is not for using the first color pallet, i.e., when the value is for using the second color pallet, the processing of step 150 is executed.

Upon executing the map display program repeating the processing of steps 310 to 160, the control circuit 24 displays the map using the display colors included in the first color pallet (see steps 320→140) when the user is setting the use of the first color pallet, and displays the map using the display colors included in the second color pallet (steps 320→150) when the user is setting the use of the second color pallet.

As described above, the car navigation device 1 selects the color pallet having a low contrast or a high contrast for displaying the map to meet the user's liking.

In the above embodiment, the car navigation device 1 corresponds to the map display device.

Further, the external storage medium 23 corresponds to the storage medium.

The control circuit 24 executing step 130 of FIG. 5, step 220 of FIG. 9 and step 320 of FIG. 10 corresponds to the determining means.

Further, the control circuit 24 executing steps 140 to 160 of FIGS. 5, 9 and 10 corresponds to the display control means.

In the above embodiment, the external storage medium 23 includes two kinds of color pallets, i.e., the first color pallet and the second color pallet. However, the color pallets need not be limited to these two kinds only, but may be three or more kinds.

For example, the second color pallet may have color contrasts higher than those of the first color pallets, the third color pallet may have color contrasts higher than those of the second color pallet, the map may be displayed by using the first color pallet when the vehicle speed is smaller than a first threshold value, the map may be displayed by using the second color pallet when the vehicle speed is equal to or greater than a first threshold value but is smaller than a second threshold value, and the map may be displayed by using the third color pallet when the vehicle speed is not smaller than the second threshold value.

In the first color pallet and in the second color pallet of the above embodiment, the constituent elements and the display colors in the display of map indirectly correspond to each other via the classification vs. pallet number table. This, however, needs not necessarily be so. That is, the constituent elements and the display colors in the display of map may directly correspond to the color pallets.

In the above embodiment, further, correspondence between the constituent elements and the display colors in the display of map in the color pallets assumes the same values for given attributes (e.g., national highway, background, etc.) as described above. That is, a display color is corresponds to a plurality of constituent elements having the same class and kind. This, however, needs not necessarily be so. For example, a display color may correspond to each constituent element.

In the above embodiments, further, the individual display colors may assume any relationship relative to one another provided the condition that the second color pallet having higher color contrasts is satisfied when the color contrasts in the whole group of display colors included in the first color pallet are compared with the color contrasts of the whole group of display colors included in the second color pallet. When the above condition is satisfied, the color intensity (or color contrast) for some pallet numbers in the second color pallet may be lower than the color intensity (or color contrast) in the group of display colors for part of a plurality of pallet numbers in the first color pallet. Here, the color intensity stands for the magnitudes of the three prime colors (RGB) of light. Further, the color intensity (or color contrast) of the group of display colors for part of the plurality of pallet numbers in the first color pallet may be the same as the color intensity (or color contrast) for some pallet numbers in the second color pallet. Therefore, changes in the color contrasts in the first color pallet and in the second color pallet can be stressed or weakened for each group of constituent elements.

Further, the color contrast for some pallet numbers in the second color pallet may be higher than the color contrasts of the group of display colors for part of the plurality of pallet numbers in the first color pallet. In addition, when the coloring for other pallet numbers is not changed in the first and second color pallets, the color intensity (or color contrast) in the whole group of display colors included in the second color pallet may be higher than the color intensity (or color contrast) in the group of display colors included in the first color pallet.

Further, the coloring specified by the second color pallet for a plurality of pallet numbers may be such that the distance between colors is great from the coloring for a particular constituent element as compared to that of the coloring specified by the first color pallet for each of the pallet numbers. Here, the particular constituent element may be, for example, the background. Therefore, the coloring of the plurality of constituent elements for the coloring for the particular constituent element becomes more distant in the second pallet than in the first pallet. It is, therefore, made possible to vary the color contrast with the particular constituent element as a reference. Further, when the particular constituent element is the background, the color contrast can be varied on the basis of the background which, in many cases, is displayed in a state where other constituent elements are superposed thereon.

Figure 11:
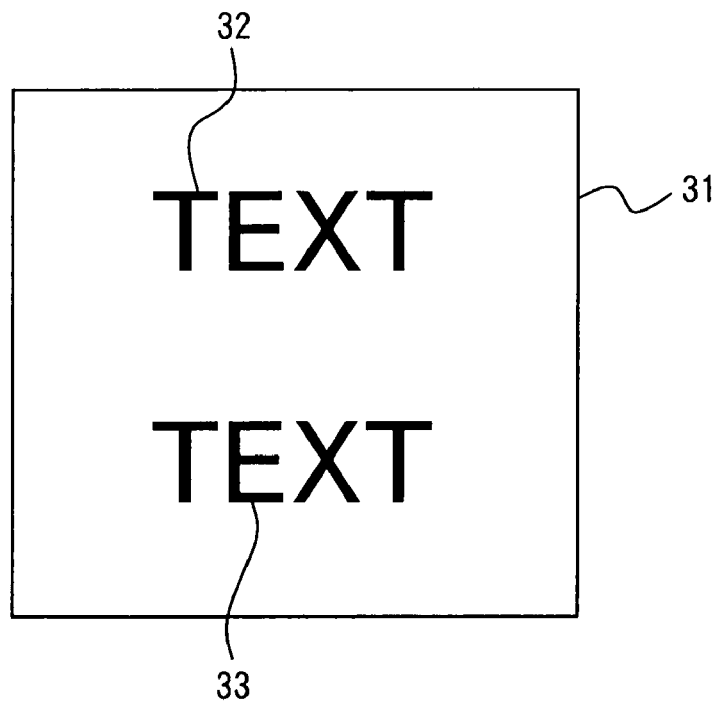
FIG. 11 is a diagram illustrating texts superposed on a background displayed on a screen.

FIG. 11 illustrates an image displayed on the display unit 20 for illustrating the superposition of the constituent elements. In the display image, a text 32 and a text 33 are superposed on the background 31. Here, the background 31, the text 32 and the text 33 pertain to classes and kinds of separate constituent elements. Here, the text 31 and the text 32 are not superposed. In this case, the distance between the colors corresponding to the color pallet of constituent elements to which the text 32 belongs and to the color pallet of constituent elements to which the background 31 belongs, is larger in the second color pallet than in the first color pallet. Similarly, further, the distance between the colors corresponding to the color pallet of constituent elements to which the text 33 belongs and to the color pallet of constituent elements to which the background 31 belongs, is larger in the second color pallet than in the first color pallet. Therefore, the user finds it easy to see the texts 32 and 33 superposed on the background 31 when the display is made on the screen by using the second color pallet.

In executing the map display program at step 160, further, the control circuit 24 in the car navigation device 1 may newly form a second color pallet by varying the contents of the second color pallet that the color contrasts of the group of two or more constituent elements superposed on the display unit 20 are greater than those of the first color pallet among the constituent elements that are really displayed.

Therefore, depending upon the condition where the constituent elements are displayed being superposed, it is allowed to flexibly vary the second color pallet in a manner to increase the color contrast among the constituent elements that are superposed.

In the above embodiments, further, the control circuit 24 selects either the first color pallet or the second color pallet by rewriting the value of the selection flag in the RAM at steps 140 and 150, and further displays, at step 160 on the display unit 20, the constituent elements in a display color according to the coloring of the selected color pallet based on the selection flag, classification vs. pallet number table in the map data and the color pallet in the map data.

However, the above selection flag needs not necessarily be used. For example, considered below is a case where the car navigation device 1 has a memory for graphic comprising VRAM, and a display control circuit for sending video signals to the display unit 20 according to the drawing data in the memory for graphic. In this case, when the control circuit 24 writes the kind of the constituent elements and the data of the display position into the VRAM as drawing data to be displayed on the display unit 20, the display unit 20 displays the constituent elements relying upon the processing by the display control circuit.

Here, it is assumed that the memory for graphic contains, in a portion thereof, a storage region for the color pallet register. The color pallet resister exists for each kind of the constituent elements of the map display. The display control circuit renders the coloring of color signals for displaying the constituent elements in the drawing data on the display unit 20 to be a color of data in the color pallet register corresponding to the constituent elements.

In this case, the control unit 24 may write, at steps 140 and 150, the values of display colors depending upon the kinds of the corresponding constituent elements in the first color pallet or the second color pallet based on the classification vs. pallet number table and may write, at step 160, the drawing data of the constituent elements to be displayed into the memory for graphic. Therefore, upon writing the data of the first color pallet or the second color pallet into the color pallet register in the memory for graphic, the constituent elements of the map can be displayed on the display unit 20 in a coloring based on the first color pallet or the second color pallet.

The above embodiments are merely described for the purpose of exemplification of the present invention, and the present invention is not limited to these embodiments. Accordingly, various modifications may be made based on the knowledge of persons skilled in the art to the above embodiments without departing from the subject matter of the present invention.

The invention claimed is:

1. A map display device comprising:
 a storage medium including constituent elements of a map, a first color pallet for specifying a coloring for said constituent elements, and a second color pallet for specifying a coloring different from that of said first color pallet for said constituent elements;
 determining means for determining whether said first color pallet or said second color pallet is to be used for displaying said constituent elements; and
 display control means for displaying the constituent elements of the map on a display unit in coloring based on said first color pallet or said second color pallet determined by said determining means; wherein
 a group of display colors used for the coloring of said second color pallet has color contrasts higher than those of a group of display colors used for the coloring of said first color pallet.

2. A map display device according to claim 1, wherein a color system of coloring for a particular constituent element in said first color pallet is nearly the same as a color system of coloring for said particular constituent element in said second color pallet.

3. A map display device according to claim 2, wherein the coloring for the particular constituent element of said second color pallet includes an increased intensity of a principal component constituting the color system of said coloring among three prime colors of light as compared to the coloring for the particular constituent element of said first color pallet.

4. A map display device according to claim 2, wherein the coloring for the particular constituent element of said second color pallet includes a decreased intensity of a minor component constituting the color system of said coloring among the three prime colors of light as compared to the coloring for the particular constituent element of said first color pallet.

5. A map display device according to claim 2, wherein the coloring for the particular constituent element of said second color pallet is denser than the coloring for the particular constituent element of said first color pallet.

6. A map display device according to claim 1, which is mounted on a vehicle, wherein said determining means determines to use said second color pallet when the speed of the vehicle that is traveling is greater than a predetermined value, and determines to use said first color pallet when the speed of the vehicle that is traveling is smaller than the predetermined value.

7. A map display device according to claim 1, which is mounted on a vehicle, wherein said determining means determines to use said second color pallet when the amount of sunlight falling on the vehicle that is traveling is greater than a predetermined value, and determines to use said first color pallet when the amount of sunlight falling on the vehicle that is traveling is smaller than the predetermined value.

8. A map display device according to claim 1, wherein said determining means determines to use said first color pallet or said second color pallet for the display of said constituent element based on a setting operation performed by a user.

9. A map display device according claim 1, wherein a group of display colors used for the coloring of said second color pallet for part of said constituent elements has color intensities which are the same as,or lower than, those of a group of display colors used for the coloring of said first color pallet for said part of constituent elements.

10. A map display device according to claim 1, wherein said display control means forms said second color pallet so that color contrasts of a group of constituent elements superposed one upon the other become greater than those of said first color pallet among the constituent elements displayed on the display unit.

11. A map display device comprising:
 a storage medium;
 a control unit coupled to the storage medium, the control unit configured to:
  read from the storage medium constituent elements of a map, a first color pallet for specifying a coloring for said constituent elements, and a second color pallet for specifying a coloring different from that of said first color pallet for said constituent elements;
 determine whether said first color pallet or said second color pallet is to be used for displaying said constituent elements; and
 display the constituent elements of the map on a display unit in coloring based on said first color pallet or said second color pallet determined by said determining means; wherein
 a group of display colors used for the coloring of said second color pallet has color contrasts higher than those of a group of display colors used for the coloring of said first color pallet.

12. A map display device according to claim 11, wherein the control unit being further configured to:
 color a particular constituent element in said first color pallet nearly the same as said particular constituent element in said second color pallet.

13. A map display device according to claim 12, wherein the coloring for the particular constituent element of said second color pallet includes an increased intensity of a principal component among three prime colors of light as compared to the coloring for the particular constituent element of said first color pallet.

14. A map display device according to claim 11, wherein the control unit is further configured to determine to use said second color pallet when a vehicle travel speed is greater than a predetermined value, and determine to use said first color pallet when the vehicle travel speed is smaller than the predetermined value.

15. A map display device according to claim 11, wherein the control unit is further configured to determine to use said second color pallet when the amount of sunlight detected by a sunlight sensor is greater than a predetermined value, and determine to use said first color pallet when the amount of sunlight is smaller than the predetermined value.

* * * * *